(12) United States Patent
Coates

(10) Patent No.: US 7,942,256 B2
(45) Date of Patent: May 17, 2011

(54) MULTI-STAGE PROCESS HANDLING EQUIPMENT

(75) Inventor: Michael Jonathan Coates, Otley (GB)

(73) Assignee: Crown Packaging Technology, Inc., Alsip, IL (US)

( * ) Notice: Subject to any disclaimer, the term of this patent is extended or adjusted under 35 U.S.C. 154(b) by 941 days.

(21) Appl. No.: 11/792,853

(22) PCT Filed: Dec. 22, 2005

(86) PCT No.: PCT/EP2005/057084
§ 371 (c)(1),
(2), (4) Date: Jun. 12, 2007

(87) PCT Pub. No.: WO2006/067207
PCT Pub. Date: Jun. 29, 2006

(65) Prior Publication Data
US 2008/0168815 A1      Jul. 17, 2008

(30) Foreign Application Priority Data

Dec. 23, 2004   (EP) ..................................... 04270020

(51) Int. Cl.
*B65G 47/84* (2006.01)
(52) U.S. Cl. ........................................ 198/608; 198/441
(58) Field of Classification Search ............... 198/347.2, 198/377.01, 441, 469.1, 470.1, 575, 580, 198/608, 624, 384, 450; 414/222.07, 222.09, 414/222.11, 223.01; 53/154, 251, 253, 277, 53/278
See application file for complete search history.

(56) References Cited

U.S. PATENT DOCUMENTS

| 1,775,381 | A | * | 9/1930 | Angus ....................... 198/803.14 |
| 3,491,511 | A | * | 1/1970 | Nigrelli et al. ................. 156/539 |
| 3,983,729 | A | | 10/1976 | Traczyk et al. |
| 4,143,776 | A | * | 3/1979 | Meyers et al. ............. 198/346.2 |
| 4,164,997 | A | * | 8/1979 | Mueller ......................... 198/427 |
| 4,467,908 | A | * | 8/1984 | Schneider ..................... 198/441 |
| 4,697,691 | A | * | 10/1987 | Zodrow et al. ................. 198/426 |
| 4,803,055 | A | * | 2/1989 | Ueda ............................ 422/297 |
| 4,808,053 | A | | 2/1989 | Nagai et al. |
| 5,165,340 | A | * | 11/1992 | Karlyn et al. ................. 101/126 |
| 5,282,375 | A | | 2/1994 | Lee, Jr. et al. |
| 5,404,894 | A | * | 4/1995 | Shiraiwa ......................... 134/66 |
| 5,451,130 | A | * | 9/1995 | Kempf ............................ 414/27 |
| 5,549,444 | A | * | 8/1996 | Dubuit ....................... 414/796.7 |
| 5,612,068 | A | * | 3/1997 | Kempf et al. ................. 425/574 |
| 5,662,207 | A | * | 9/1997 | Lehmann ...................... 198/447 |
| 5,749,631 | A | * | 5/1998 | Williams ....................... 198/441 |
| 5,951,239 | A | * | 9/1999 | Averill et al. .................. 414/801 |
| 6,019,564 | A | * | 2/2000 | Kiyokawa et al. ........ 414/223.01 |
| 6,112,880 | A | * | 9/2000 | Flix ............................. 198/419.2 |
| 6,517,691 | B1 | * | 2/2003 | Bluck et al. .............. 204/298.25 |
| 7,089,715 | B2 | * | 8/2006 | Topf ................................. 53/426 |
| 7,571,585 | B2 | * | 8/2009 | Till .................................. 53/167 |
| 7,643,904 | B2 | * | 1/2010 | Aoyama et al. ............... 700/248 |
| 7,661,522 | B2 | * | 2/2010 | Hausladen .................. 198/377.01 |

* cited by examiner

*Primary Examiner* — Douglas A Hess
(74) *Attorney, Agent, or Firm* — Miles & Stockbridge, P.C.; David R. Schaffer, Esq.

(57) ABSTRACT

An apparatus for handling articles (4) through a multi-stage process, the apparatus comprising at least one rotatable process turret (2) having a number of pockets (3), wherein each pocket (3) is adapted to support an article (4). The pockets (3) are arranged in groups and each group of pockets (3A, 3B, 3C) has associated tooling (5A, 5B, 5C), which carries out one stage of the process. The articles (4) are initially fed into one group of pockets (3A) only. A re-phase means (6) is provided to transfer the article (4) from one group of pockets (3A, 3B) to another (3B, 3C).

20 Claims, 4 Drawing Sheets

MULTI-STAGE PROCESS HANDLING EQUIPMENT

BACKGROUND OF THE INVENTION

The present invention relates generally to handling equipment and more particularly to equipment for transferring articles through a multi-stage process. Such multi-stage processes may include, for example, the shaping of metal containers, which is generally carried out in a number of stages. The shape of the metal container needs to be gradually reformed through a series of small steps, in order to ensure that the metal is not over-stressed. Thus, processes such as necking or general can shaping are suitable for application of the invention. The invention provides a design of machinery suitable for transferring articles through a multi-stage process. The resultant machinery has a reduced floor footprint compared to conventional equipment.

A multi-stage process may involve about 50 individual stages, each requiring different tooling. As an article moves through a multi-stage process, it needs to be presented to the tooling required for each stage of the process and thus, the machinery utilised for such processes may become very large, taking up a large amount of space on the factory floor. This has disadvantages for both the efficient use of space and also the time required to transport the articles between the tooling used to carry out the various stages of the process.

It has been common practice for over 20 years to replace many in-line conveyor systems with a series of rotating circular turrets, which support a plurality of articles. For example, U.S. Pat. No. 3,983,729 (NATIONAL CAN CORPORATION). 1976-10-05. describes a method and apparatus for necking and flanging the open end of a cylindrical container, such as a food can. The containers are transported through this multi-stage process, supported on the periphery of a circular turret. U.S. Pat. No. 4,808,053 (HOKKAI CAN COMPANY). 1989-02-28. describes another handling system, in which a barrel and a cover are combined. The apparatus described in this patent again comprises a number of circular turrets upon which the containers (or parts thereof) are transported.

U.S. Pat. No. 5,282,375 (REYNOLDS METAL COMPANY). 1994-02-01. describes a handling system for necking the open end of a metal container body. In this arrangement, the metal container bodies are supported on the periphery of a circular turret by means of suction applied to a series of base pads defining a series of "pockets" around the periphery of the turret.

A disadvantage of these systems is that a large number of circular turrets may be required to complete the multi-stage process and although of reduced size compared to an in-line conveyor system, this may still occupy a significant proportion of a factory's floor space. Therefore, an aim of the present invention is to provide a more compact design of machinery for handling articles through a multi-stage process.

SUMMARY OF THE INVENTION

Accordingly, the invention provides an apparatus for transporting articles through a multi-stage process, the apparatus comprising at least one rotatable process turret having a number of pockets, each pocket adapted to support an article, characterised in that the pockets are divided into groups, each group of pockets having associated tooling and the apparatus further comprises a re-phase means to transfer an article from one group of pockets to the next.

The advantage of grouping the pockets on the process turret and providing one or more re-phase means is that several stages of the multi-stage process may be carried out on a single process turret. This decreases the "footprint" of the apparatus required to carry out the multi-stage process and optimises use of the factory floor space.

Where a multi-stage process has a greater number of stages, a single process turret may be insufficient. In this situation, a plurality of process turrets may be arranged in a line. One or more re-phase devices may be associated with each process turret. Alternatively, the re-phase device or devices may be arranged at one or more locations within the line.

Alternatively, a plurality of process turrets may be arranged in a loop and one or more re-phase devices located within the loop. In this arrangement, articles pass around the loop in one group of pockets, before being transferred into the next group of pockets by one or more re-phase means. The articles then do another lap of the process turret loop and are re-phased again, if required. In this arrangement, it is important to note that the number of laps required to finish the multi-stage process equates to the number of groups defined in the system. The number of process turrets and the number of laps that an article has to make before completing the multi-stage process may be optimised. Another advantage of this arrangement is that after the initial start-up lap or laps, the process turrets will fill with articles (leaving no vacant pockets).

Circular turrets, as hereinbefore described, may also provide the re-phase means and transfer means.

The present invention will now be described, by way of example only, with reference to the accompanying drawings, in which:

BRIEF DESCRIPTION OF THE PREFERRED EMBODIMENTS

Figure 1:
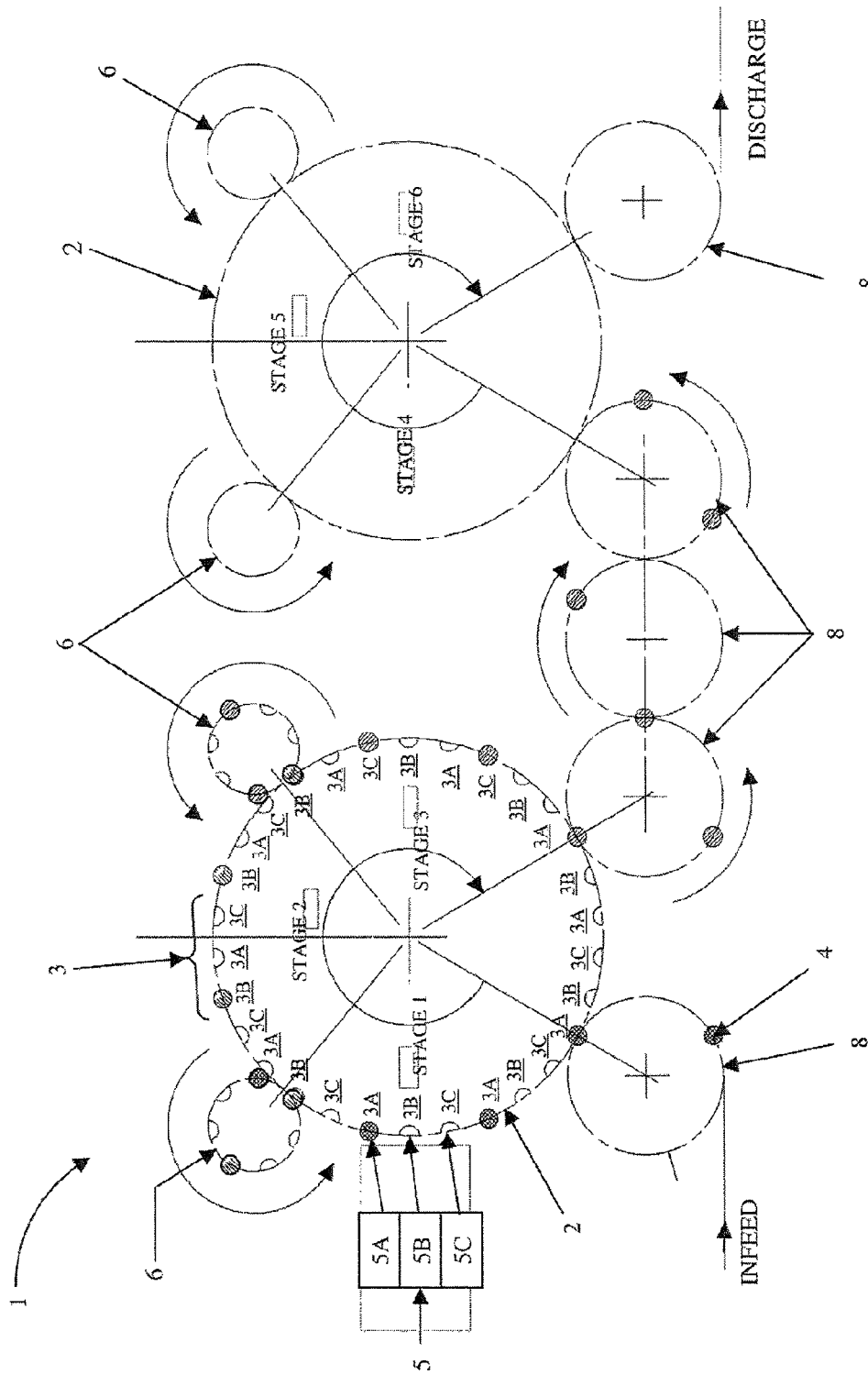
FIG. 1 shows a schematic view of the apparatus used to carry out a six-stage die necking process, with 3 stages of the die necking process carried out on each process turret and two phase-change means associated with each process turret.

Referring to FIG. 1, a 6-stage process for shaping metal cans 4 is carried out on an apparatus 1, comprising two rotatable turrets 2, each turret adapted to carry out 3 stages of the can shaping process. Each turret 2 has 30 pockets 3, divided into 3 groups, A, B and C. Tooling 5 for carrying out the shaping process is arranged to act on the cans 4 in one group of pockets 3 only. Therefore tooling 5A, will only act on the cans 4 pockets 3A, tooling 5B on the cans 4 in pockets 3B only and tooling 5C on the cans 4 in pockets 3C only.

Cans 4 are fed into pockets 3A on the first turret 2 at the "infeed". Pockets 3B and 3C remain empty at this stage. Tooling 5A then carries out stage 1 of the multi-stage process on the cans 4 in pockets 3A. Once stage 1 is complete, re-phase means 6 (comprising another turret having 7 pockets) transfers the cans 4 from pocket 3A to pocket 3B. Tooling 5B then carry out stage 2 of the multi-stage process on the cans 4 in pockets 3B. Once stage 2 is complete, another re-phase means 6 transfers the cans 4 from pocket 3B to pocket 3C. Tooling 5C then carries out stage 3 of the multi-stage process on the cans 4 in pockets 3C.

Once the first 3 stages of the process are complete transfer turrets 8 transfer the cans 4 to the relevant pockets 3 of a second process turret 2, where phases 4, 5 and 6 of the multi-stage process are carried out in the same manner as described above (in relation to the first process turret 2). Once all 6 stages are complete, the finished cans 4 are discharged (as shown).

This first embodiment shows the general theory behind the use of a single process turret to carry out a number of stages of a multi-stage process. A disadvantage of the apparatus described in FIG. 1 is that ⅔ of the pockets 3 on the process turret remain empty at any one time and four re-phase turrets 6 are required.

Figure 2:
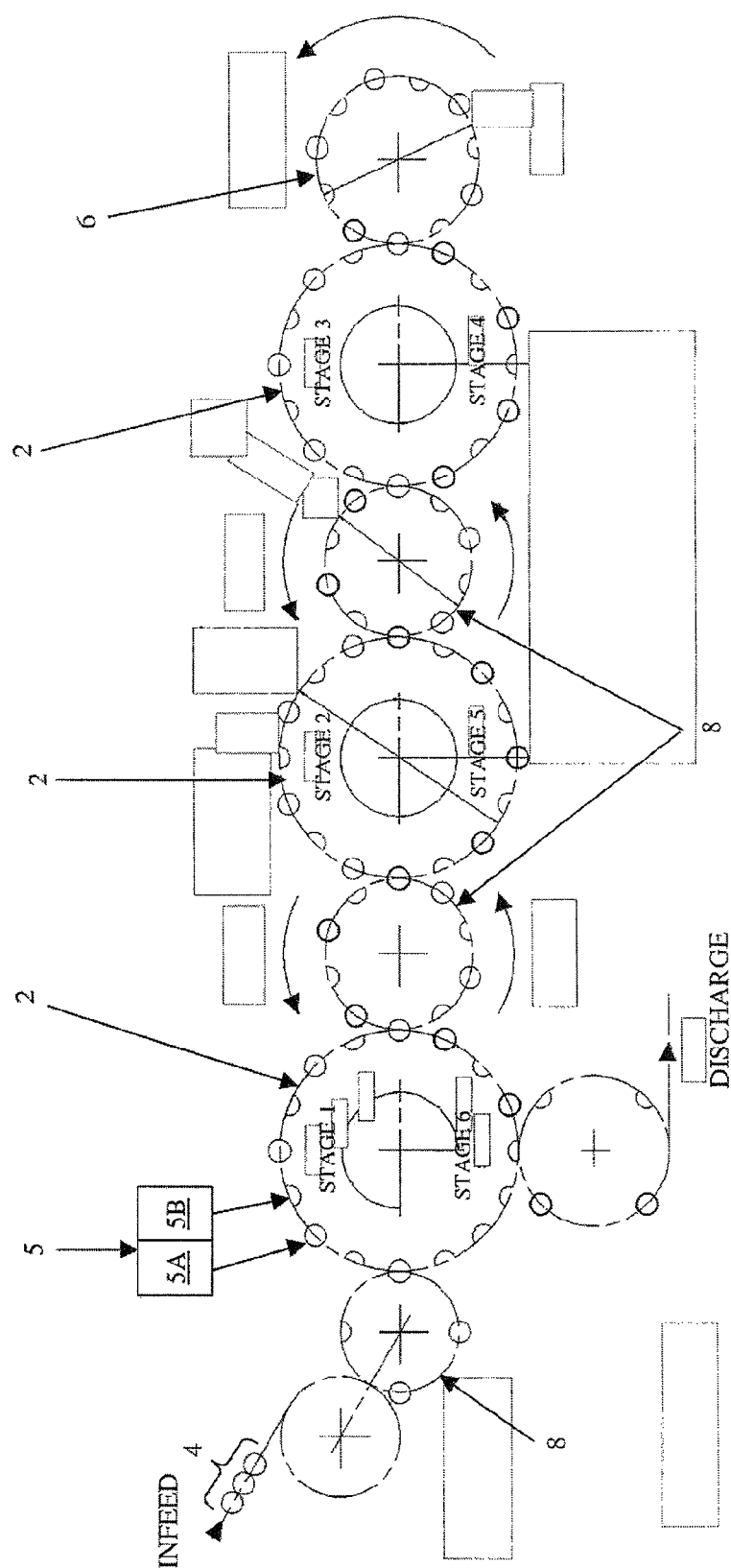
FIG. 2 shows a schematic view of the apparatus used to carry out the same six-stage die necking process, with two stages of the die necking process carried out on each of three process turrets, which are arranged in a line and interspersed with smaller transfer turrets. One re-phase means is provided at the end of the line.

FIG. 2 shows another embodiment of the invention, where only two stages are carried out on each rotatable process turret 2 and the process turrets 2 are arranged in a line interconnected by transfer turrets 8. Cans 4 are fed in to pockets 3A on the first process turret 2 at the "infeed". Pockets 3B remain empty at this stage. Tooling 5A then carries out stage 1 of the multi-stage process on the cans 4 in pockets 3A. The transfer turret 8 then transfers the cans 4 into pockets 3A on the second process turret 2, where a different set of tooling 5A carries out stage 2 of the process. As before, the cans 4 are then be transferred to a third process turret 2, where stage 3 of the process is completed. Finally, the cans 4 arrive at the re-phase means 6, where they are transferred from pockets 3A into pockets 3B.

The cans 4 pass back down the same line of process turrets 2 and stages 4 to 6 of the process are carried out on the cans 4, using tooling 5B associated with the pockets 3B. Once all 6 phases of the multi-stage process are completed, the cans 4 are discharged from the apparatus, as shown in FIG. 2. This arrangement has the advantage that only ½ the pockets 3 are vacant at any one time and only a single re-phase means 6 is required (in the line).

Figure 3:
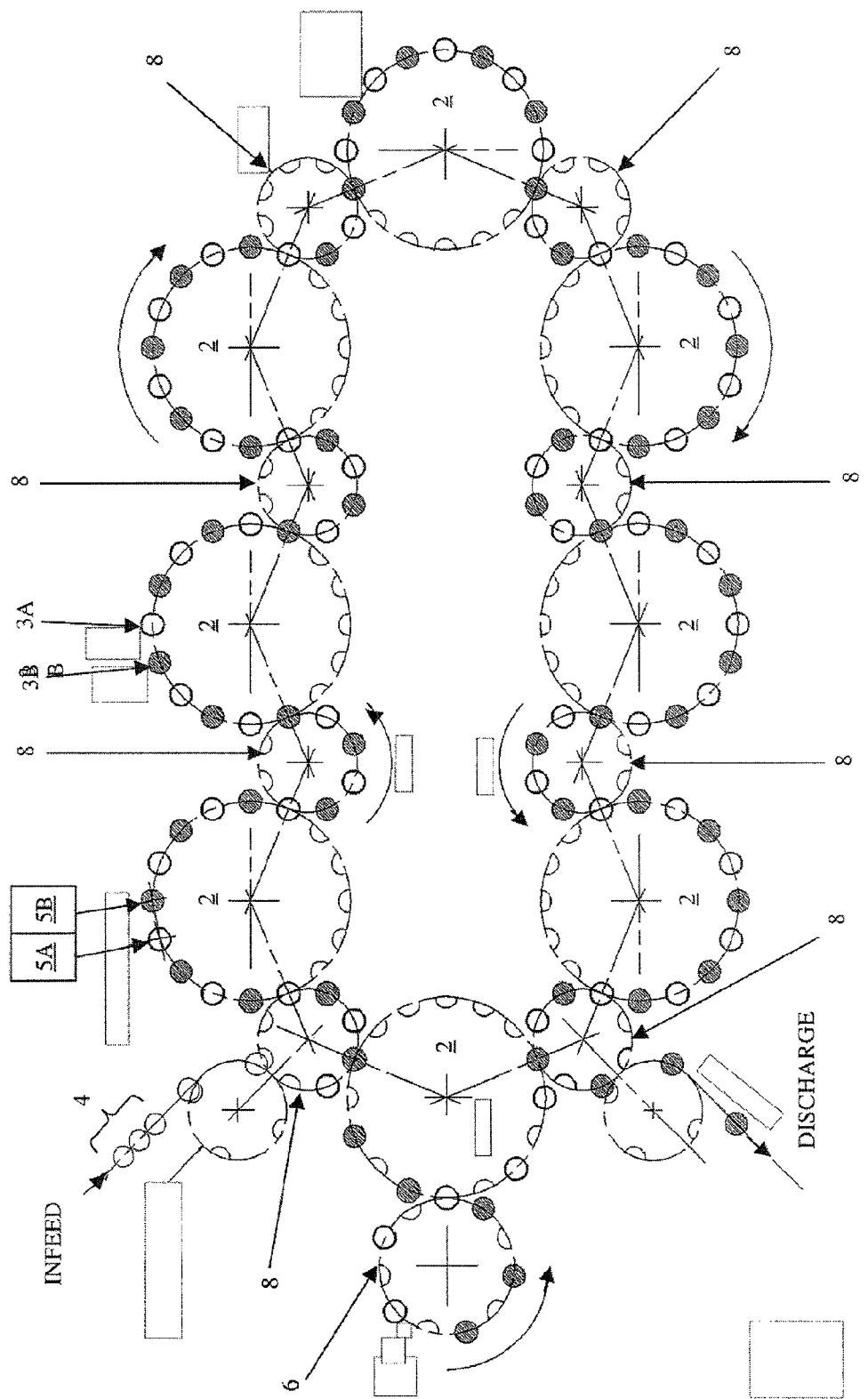
FIG. 3 shows a schematic view of the apparatus used to carry out a multi-stage die necking process, on seven process turrets, which are arranged in a loop. The pockets of each process turret are divided into two groups and one re-phase means is provided at the end of the loop of process turrets.

This general idea is carried further in the embodiment shown in FIG. 3, where it is possible to achieve full capacity of all the pockets 3 on the process turrets 2 (i.e. each pocket 3 carries a can 4). The embodiment shown in FIG. 3 is based on a similar a principle to that described in relation to FIG. 2, except that the process turrets 2 are arranged in a loop and a re-phase means 6 is provided at the end of the loop. In the example illustrated in FIG. 3, seven process turrets 2, interconnected by transfer turrets 8, form a loop. Initially, cans 4 are fed into every other pocket 3A on the first process turret 2. Alternate pockets 3B remain vacant. During the first lap, tooling 5A operates on the cans 4 in the first group of pockets 3A and completes stages 1 to 7 of a multistage process. When the cans 4 have progressed to the end of the loop, a re-phase means 6 transfers the cans 4 into the alternate pockets 3B, where tooling 5B acts on the cans 4. The cans 4 proceed around the loop of process turrets 2 again and stages 8 to 14 of the multi-stage process are completed, before the cans 4 are discharged. During this second lap, cans 4 continue to be fed into pockets 3A, such that all the pockets 3 on the process turrets 2 are full and alternate tooling 5A and 5B is operating on the cans 4 in the pockets 3A and 3B respectively.

Although the apparatus shown in FIG. 3 illustrates an example where two laps of the process turrets 2 is required to complete the multi-stage process, it will be apparent to those skilled in the art that the number of laps carried out by a can 4 may be greater if required. The number of laps carried out by a can 4 will be governed by the number of groups of pockets 3 remaining vacant on initial start up of the process.

Figure 4:
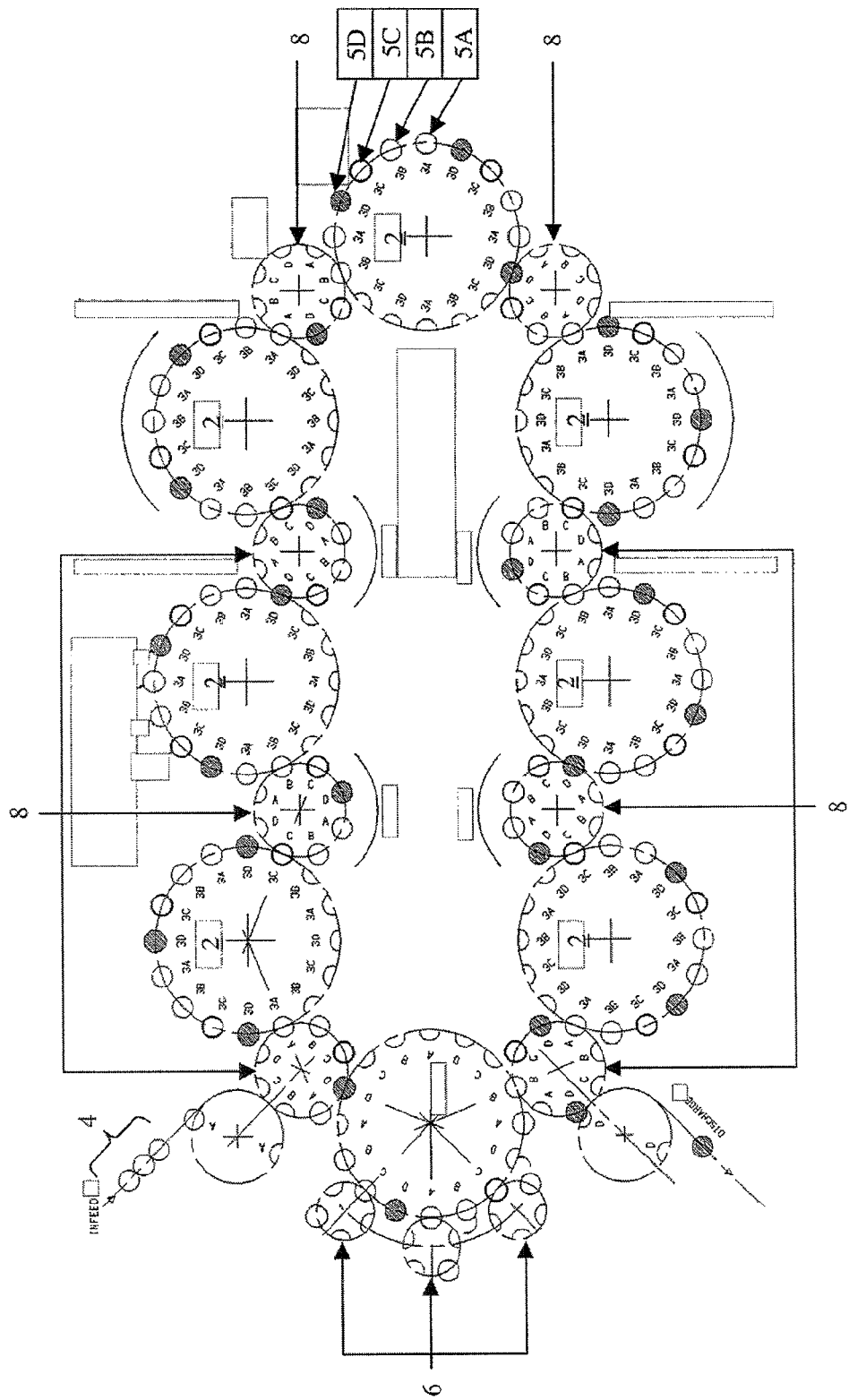
FIG. 4 shows a schematic view of an apparatus comprising seven process turrets arranged in a loop (similar to FIG. 3). In this arrangement, the pockets on each process turret are divided into four groups and three re-phase means are provided at the end of the loop.

Referring now to FIG. 4, seven process turrets 2 are again interconnected by transfer turrets 8 to form a loop. Initially, cans 4 are fed into pockets 3A on the first process turret 2. The remaining pockets, 3B, 3C and 3D remain vacant. During the first lap, tooling 5A operates on the cans 4 in the first group of pockets 3A and completes stages 1 to 7 of a multistage process. When the cans 4 have completed the first lap of the loop of process turrets 2, the first of a series of three re-phase means 6 transfers the cans 4 from the group A pockets into the group B pockets, where tooling 5B acts on the cans 4. The cans 4 proceed around a second lap of the process turrets 2 and stages 8 to 14 of the multi-stage process are completed. As previously described, the cans 4 are then moved from the group B pockets to the group C pockets and proceed around a third lap of the process turrets 2. On completion of this third lap, the cans 4 are then moved from the group C pockets to the group D pockets to complete a fourth lap of the process turrets 2. Once the cans 4 have completed the fourth lap, they are discharged from the apparatus.

After the first group of cans 4 is moved from the group A pockets into the group B pockets, further cans 4 are loaded into the group A pockets and tooling 5A and 5B operates on the cans 4 simultaneously. The cans 4 in the group B pockets are then moved in the group C pockets, the cans 4 in the group A pockets are moved into the group B pockets and new cans 4 are loaded into the group A pockets. This is repeated as the cans 4 complete further laps. Thus on initial start up, the apparatus has cans 4 in the group A pockets only. During the second lap, the process is completed with cans in both the group A pockets and the group B pockets. During the third lap, cans 4 are present in the group A, B and C pockets. Finally, cans 4 are present in all pockets 3A, 3B, 3C and 3D (i.e. the turrets 2 are fully loaded). The process with then continue with the turrets 2 fully loaded and cans 4 fed into the apparatus in the group A pockets 3A and are discharged from the apparatus from the group D pockets 3D.

The term "pocket" used throughout this description is merely intended to describe a location where cans 4 are supported about the periphery of a turret and is not intended to limit the disclosure of the invention to a system including turrets with recesses within which cans 4 are retained. Other suitable means for supporting cans 4 about the periphery of a turret include for example magnetic or suction pads or a mechanical pincer system.

Rotatable turrets, having pockets at the periphery thereof have been described to provide the transfer means and re-phase means. However, other means of transporting/re-phasing articles to which the multi-stage process is applied are also envisaged and considered to fall within the scope of the present invention. For example, the transfer and re-phase devices may take the form of a connected series of links.

Furthermore, it will be apparent to those skilled in the art, that the apparatus described in the figures may be adapted to carry out any multi-stage process requiring a different number of stages to that described. Also, the number of different tooling sets and associated groups of pockets may be varied as required by the particular process. The number and location of the transfer means and re-phase means may also be varied, to suit the particular application and the apparatus according to the invention may be modular in construction.

Although a preferred embodiment of the invention has been specifically illustrated and described herein, it is to be understood that minor variations may be made in the apparatus without departing from the spirit and scope of the invention, as defined by the appended claims.

What is claimed is:

1. An apparatus for handling metal containers (4) through a multi-stage process, the apparatus comprising at least one rotatable process turret (2) having a plurality of pockets (3), each pocket (3) adapted to support a metal container (4), the pockets (3) are divided into groups (A, B, C), each group of pockets (3A, 3B, 3C) having associated tooling (5A, 5B, 5C) for carrying out a process on the metal containers while supported in the group of pockets, ands re-phase means (6) to transfer the metal container (4) from one group of pockets (3A, 3B, 3C) to the next, the rotatable process turret, the tooling, and the pockets being connected about one common rotatable axis.

2. The apparatus according to claim 1, wherein the metal containers (4) are only fed into one group of pockets (3A) on the process turret (2) and the pockets (3B, 3C) belonging to the other group or groups remain vacant.

3. The apparatus according to claim 2, wherein the re-phase means (6) comprises a rotatable re-phase turret and rotation of the re-phase turret is synchronized with the rotation of the process turret (2), so that the pockets (3) of each align.

4. The apparatus according to claim 2, wherein each process turret (2) has at least one associated re-phase means (6).

5. The apparatus according to claim 2, wherein a plurality of process turrets (2) are associated with one re-phase means (6).

6. The apparatus according to claim 2, wherein a plurality of process turrets (2) are associated with a plurality of re-phase means (6).

7. The apparatus according to claim 1, wherein the re-phase means (6) comprises a rotatable re-phase turret and rotation of the re-phase turret is synchronized with the rotation of the process turret (2), so that the pockets (3) of each align.

8. The apparatus according to claim 7, wherein each process turret (2) has at least one associated re-phase means (6).

9. The apparatus according to claim 7, wherein a plurality of process turrets (2) are associated with one re-phase means (6).

10. The apparatus according to claim 7, wherein a plurality of process turrets (2) are associated with a plurality of re-phase means (6).

11. The apparatus according to claim 1, wherein each process turret (2) has at least one associated re-phase means (6).

12. The apparatus according to claim 11, wherein a plurality of process turrets (2) are associated with one re-phase means (6).

13. The apparatus according to claim 11, wherein a plurality of process turrets (2) are associated with a plurality of re-phase means (6).

14. The apparatus according to claim 1, wherein a plurality of process turrets (2) are associated with one re-phase means (6).

15. The apparatus according to claim 14, wherein a plurality of process turrets (2) is arranged in a loop and one or more re-phase means (6) is arranged within the loop.

16. The apparatus according to claim 15, wherein the metal container (4) makes more than one lap around the loop of process turrets (2).

17. The apparatus according to claim 14, wherein a plurality of process turrets (2) are associated with a plurality of re-phase means (6).

18. The apparatus according to claim 1, wherein a plurality of process turrets (2) are associated with a plurality of re-phase means (6).

19. The apparatus according to claim 18, wherein a plurality of process turrets (2) is arranged in a loop and one or more re-phase means (6) is arranged within the loop.

20. The apparatus according to claim 1, wherein the number of pockets (3) on the process turret (2) is a multiple of the number of groups.

\* \* \* \* \*